June 11, 1968  P. ZAKUS  3,388,289
LAMP FAILURE DETECTOR AND STANDBY DEVICE
Filed April 11, 1966

INVENTOR
PAUL ZAKUS
BY
ATTORNEY

United States Patent Office 3,388,289
Patented June 11, 1968

3,388,289
LAMP FAILURE DETECTOR AND
STANDBY DEVICE
Paul Zakus, 140 15th St. W., Prince Albert,
Saskatchewan, Canada
Filed Apr. 11, 1966, Ser. No. 541,739
2 Claims. (Cl. 315—83)

ABSTRACT OF THE DISCLOSURE

A vehicle lighting system including headlamps with upper and lower beam filaments and parking lamps, along with a conventional main switch and dimmer switch. An automatic control device provides a separate current path from the switches to each parking lamp and to each filament of the headlamps, each separate current path including a relay which automatically closes circuit to the parking lamps when the headlamp filament in that current path is broken.

---

My invention relates to new and useful improvements in lighting systems for automobiles, trucks and the like.

Such systems normally include a pair of head lamps and a pair of parking lamps, selection of one or the other being by means of a switch adjacent the driving position of the car or truck.

If one of the head lamp filaments burns out, this fact is often not noticed by the operator, particularly if he is driving in cities or towns which are relatively well illuminated.

It is obviously desirable to be aware of such failure immediately not only for the reason of safety but also because it is against the law to drive with one head lamp extinguished.

The present device or system overcomes these disadvantages by not only indicating to the operator that a head lamp is burned out, but also by automatically switching on the parking lights so that at all times, two lights are visible at the front of the automobile or truck.

This is accomplished by the provision of a two position relay in circuit with the head lamp system, said relay being connected, when energized, to the head lamps. If the filament of one of the head lamps fails, the relay becomes de-energized thus automatically switching the system to the parking lights and to the indicator device which is in circuit with the parking lights.

Although the present device is explained specifically with relation to head lamps and parking lamps, it will nevertheless be appreciated that a similar system can be incorporated with any electrically operated device such as tail lights, position lights and the like.

The principal object and essence of my invention is therefore to provide a device of the character herewithin described which automatically switches the lighting system of an automobile or truck to the parking lights and indicator means if one filament in the head lamp fails.

Another object of the invention is to provide a device of the character herewithin described which can readily be incorporated into existing systems.

A yet further object of the invention is to provide a device of the character herewithin described which is simple in construction, economical in manufacture and otherwise well suited to the purpose for which it is designed.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which.

In the drawings like characters of reference indicate corresponding parts in the different figures.

Figure 1:
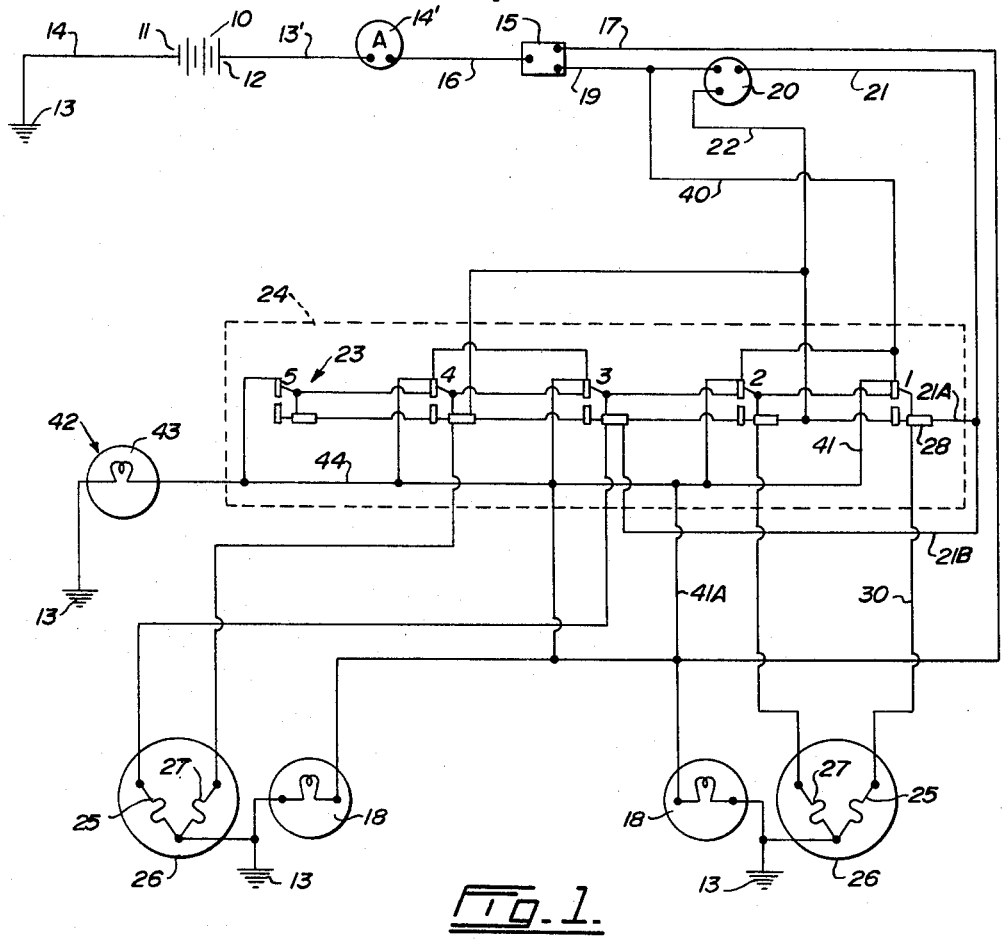
FIGURE 1 is an electrical schematic view of a typical automobile lighting circuit with my device incorporated therein.
Figure 2:
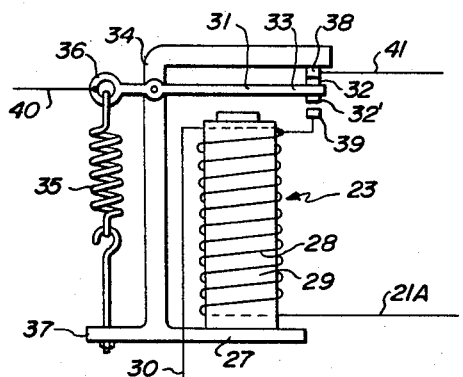
FIGURE 2 is a schematic view of one of the relays enlarged with reference to FIGURE 1.

Proceeding therefore to describe my invention in detail, reference to FIGURE 1 will show that I have illustrated a source of electrical energy or the battery 10, the negative side 11 being connected to ground 13 by means of electrical conduit 14. The positive side 12 is connected by means of an electrical conduit 13' to a conventional ammeter 14' and is then conveyed to a head light and park light switch assembly 15 by means of electrical conduit 16.

A conduit 17 extends from the switch assembly 15 to a pair of parking lights 18 and thence to ground 13 in the conventional manner so that when conduit 16 is connected to conduit 17 by means of the switch assembly 15, the parking lights are illuminated.

A further conduit 19 also extends from the switch assembly 15 and is connected to a dimmer switch assembly 20. This switch connects conduit 19 either to a conduit 21 or a conduit 22.

A set of relays collectively designated 23 are contained within a convenient box or casing 24 shown by the dotted outline in FIGURE 1.

In the present device, five such relays are shown numbered 1 to 5 inclusively, it being understood that any such number of relays may be incorporated depending upon the number of functions to be incorporated within the system.

Relays 1 and 3 are connected to the high beam sides 25 of head lamps 26 and relays 2 and 4 are connected to the low beam side 27 of head lamps 26.

Inasmuch as the circuitry is similar, only one such circuit will be described in detail.

Dealing with the relay number 1, this consists of a support frame 27 upon which is mounted a coil 28 surrounding an iron core 29. When the dimmer switch 20 is operated to connect conduit 19 to 21, current flows through this conduit 21 to branches 21A and 21B. Branch 21A leads to the coil 28 and branch 21B leads to the corresponding coil in relay number 3.

Current flows through branch 21A, through the coil 28 and then to the conduit 30 which extends to the high beam head light 25 and thence to ground 13 so that when the head light switch 15 and the dimmer switch 20 are operated to complete the circuit between the battery 10 and the head light 26, the current flows through conduits 13', 16, 19, 21, 21A, through the coil 28 and thence to the conduit 30.

Also mounted within the relay frame 27 is a movable arm 31 having points 32 and 32' upon the distal end 33 thereof. This arm is pivotal within the frame 34 and is under tension of spring 35 reacting between the end 36 of the arm and the base 37 of the frame.

The frame also includes an upper point 38 and a lower point 39. When the coil is not energized, the spring 35 normally maintains the point 32 on the arm 31, in contact with the upper point 38.

However, when the coil is energized by the closing of the head light switch assembly 15, the arm 31 is moved downwardly by the armature or core 29 against pressure of spring 35 thus connecting point 32' with the lower point 39.

A branch conduit 40 extends from conduit 19 between the switch assembly and the dimmer switch 20 to the points 32 and 32' of the movable arm 31. Furthermore, the conduit 30 at the end of coil 28 is connected to the lower point 39.

When the switch 15 is closed, current flows through the coil to the high beam side of the head light 25 and also flows through the movable arm 31 via conduit 40.

As soon as the coil is energized, point 32′ contacts point 39 thus connecting conduit 40 with conduit 30 in parallel with the coil 28. This enables the main load to pass through the points 39 and 32′, sufficient current passing through the coil 28 to maintain the points closed.

If, however, the filament of the high beam head lamp 25 breaks, the circuit through the coil 28 is interrupted so that spring 35 moves the movable arm upwardly so that point 32 now contacts upper point 38.

An electrical conduit 41 extends from the upper point 38 to conduit 41A and thence to the parking light 18 as clearly shown so that with the points 32 and 38 in contact by means of spring 35, the circuit from the battery 10 is completed to the parking lights 18.

In parallel with the parking light circuit is an indicator means collectively designated 42 which, in this embodiment, takes the form of an indicator lamp 43 mounted on the dashboard of the car or truck.

A branch conduit 44 extends from the conduit 41 to the lamp 43 and thence to ground 13 so that the lamp 43 is in parallel with the parking light 18.

As soon as the parking lights are in circuit due to the relay, the lamp 43 is also illuminated thus indicating to the operator that the failure has occurred in the high beam filament 25.

Relays 2 and 4 control the operation of the device if the dimmer switch is connecting the low beam head lights 27, the circuitry being the same as hereinbefore described.

Relay number 5 may be utilized in circuit with such things as rear lamps or clearance lights as desired.

Since various modifications can be made to the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction, and operation of such concept, and not for the purpose of limiting protection to any specific embodiment or details thereof.

I claim:

1. In a vehicle lighting system, the combination of a source of current, a main switch connected to said source of current and having a headlight terminal and a parking light terminal, a pair of parking lights, a parking light conductor connecting said parking lights in parallel to said parking light terminal of said main switch, a dimmer switch connected to said headlight terminal of the main switch and having a high beam terminal and a low beam terminal, a pair of headlights each having a high beam filament and a low beam filament, and an automatic control device operatively connecting said headlights to said main switch and to said dimmer switch whereby said parking lights may be automatically energized when any one of the filaments of said headlights is broken, said control device providing a pair of high beam current paths and a pair of low beam current paths, each of said current paths including a separate relay having a coil and first and second pairs of contacts which are respectively closed and open when said coil is energized and which are respectively open and closed when the coil is not energized, the respective relay coils of the high beam current paths being connected in series with the respective high beam filaments to the high beam terminal of said dimmer switch and the respective relay coils of the low beam current paths being connected in series with the respective low beam filaments to the low beam terminal of the dimmer switch whereby each relay coil is energized when the associated headlight filament is operative, the first pair of relay contacts in each of the several current paths closing a circut from said headlight terminal of said main switch to its respective headlight filament in by-pass of the associated relay coil as long as the coil is energized, and the second pair of relay contacts in each of the several current paths closing a circuit from said headlight terminal of the main switch to said parking light conductor when any one of the relay coils is de-energized by breakage of the associated headlight filament.

2. The lighting system as defined in claim 1 together with a single pilot lamp connected in parallel to the second pair of relay contacts in the several current paths whereby the pilot lamp may be energized when the second pair of contacts in any one of the current paths are closed.

References Cited

UNITED STATES PATENTS

| | | | |
|---|---|---|---|
| 2,414,932 | 1/1947 | Crockett | 315—82 |
| 2,427,076 | 9/1947 | Tabacchi | 315—83 |
| 2,528,245 | 10/1950 | Riggins | 315—83 |
| 2,540,410 | 2/1951 | Wagner | 315—83 |

JAMES W. LAWRENCE, *Primary Examiner.*

R. L. JUDD, *Assistant Examiner.*